(12) United States Patent
Crabtree et al.

(10) Patent No.: US 8,801,393 B2
(45) Date of Patent: Aug. 12, 2014

(54) PRESSURE CONTROL SYSTEM AND METHOD

(75) Inventors: Ryan W. Crabtree, Little Chute, WI (US); David J Fieber, Neenah, WI (US); Brian D Piller, Neenah, WI (US); Chad M. Trinkner, Neenah, WI (US)

(73) Assignee: Pierce Manufacturing Inc., Appleton, WI (US)

( * ) Notice: Subject to any disclaimer, the term of this patent is extended or adjusted under 35 U.S.C. 154(b) by 1407 days.

(21) Appl. No.: 11/871,543

(22) Filed: Oct. 12, 2007

(65) Prior Publication Data
US 2009/0095545 A1  Apr. 16, 2009

(51) Int. Cl.
*F04B 49/06*   (2006.01)

(52) U.S. Cl.
USPC ............................... 417/53; 60/431; 180/305

(58) Field of Classification Search
USPC .......... 417/18, 22, 29, 34, 41, 44.2, 213, 220, 417/231, 234, 236, 237, 278, 279, 280, 323, 417/375; 60/431; 180/305, 307
See application file for complete search history.

(56) References Cited

U.S. PATENT DOCUMENTS

| | | | | |
|---|---|---|---|---|
| 3,136,264 A * | 6/1964 | Wahlmark | ....................... | 91/473 |
| 3,679,327 A * | 7/1972 | Riedhammer et al. | ..... | 417/222.1 |
| 3,981,618 A * | 9/1976 | Nelson, Jr. | ....................... | 417/12 |
| 4,177,516 A | 12/1979 | Mason | | |
| 4,248,194 A * | 2/1981 | Drutchas et al. | ............... | 123/357 |
| 4,523,892 A | 6/1985 | Mitchell et al. | | |
| 4,534,707 A * | 8/1985 | Mitchell | .......................... | 417/34 |
| 4,773,369 A * | 9/1988 | Kobayashi et al. | ........... | 123/357 |
| 5,221,189 A * | 6/1993 | Henningsen | ..................... | 417/12 |
| 5,267,441 A * | 12/1993 | Devier et al. | .................... | 60/452 |
| 5,311,063 A | 5/1994 | Hubler | | |
| 5,352,095 A * | 10/1994 | Tanaka et al. | .................... | 417/12 |
| 5,468,126 A * | 11/1995 | Lukich | ............................. | 417/53 |
| 5,525,043 A * | 6/1996 | Lukich | ........................... | 417/218 |
| 5,580,221 A * | 12/1996 | Triezenberg | ................. | 417/44.2 |
| 5,682,855 A | 11/1997 | Lee et al. | | |
| 5,772,403 A * | 6/1998 | Allison et al. | ................ | 417/44.2 |
| 5,865,602 A * | 2/1999 | Nozari | .......................... | 417/44.1 |
| 5,888,051 A * | 3/1999 | McLoughlin et al. | ........... | 417/53 |
| 5,947,854 A | 9/1999 | Kopko | | |
| 6,009,953 A * | 1/2000 | Laskaris et al. | .................. | 169/13 |
| 6,010,309 A * | 1/2000 | Takamura et al. | .............. | 417/22 |
| 6,468,046 B1 * | 10/2002 | Du et al. | ..................... | 417/222.1 |

(Continued)

OTHER PUBLICATIONS

J1939-Based Higher Layer Protocols, printed from internet address: http://www.can-cia.org/j1939based/ on Dec. 21, 2006, 1 page, available prior to Oct. 12, 2007.

(Continued)

*Primary Examiner* — Devon Kramer
*Assistant Examiner* — Amene Bayou
(74) *Attorney, Agent, or Firm* — Foley & Lardner LLP

(57) ABSTRACT

A vehicle includes an engine and a liquid pump configured to pump liquid from a liquid intake system to an outlet. The vehicle further includes a pressure control system operably coupled to the engine via a communication connection, the pressure control system receiving a first signal from the engine representing engine speed. The pressure control system is configured to cause the liquid pump to change pumping pressure without changing the engine speed, and wherein the pressure control system is configured to cause the liquid pump to change pumping pressure without changing the engine speed when the pressure control system makes a determination relating to the engine speed.

10 Claims, 8 Drawing Sheets

(56) References Cited

U.S. PATENT DOCUMENTS

| | | | |
|---|---|---|---|
| 6,494,685 B2 * | 12/2002 | Carstensen | 417/44.1 |
| 6,547,528 B1 * | 4/2003 | Yoshida | 417/34 |
| 6,551,073 B1 * | 4/2003 | O'Sullivan | 417/234 |
| 6,709,241 B2 * | 3/2004 | Sabini et al. | 417/53 |
| 6,802,697 B2 * | 10/2004 | Hu | 417/53 |
| 6,814,053 B2 | 11/2004 | Hawkins et al. | |
| 7,040,868 B2 | 5/2006 | McLaughlin et al. | |
| 7,104,924 B2 | 9/2006 | Hawkins | |
| 7,503,753 B2 * | 3/2009 | Yasui | 417/53 |
| 7,726,179 B2 * | 6/2010 | Muller et al. | 73/37 |
| 2002/0176784 A1 * | 11/2002 | Du | 417/53 |

OTHER PUBLICATIONS

Idex Corporation, Products, printed from internet address: http://www.class1.com/products2.asp?catid=1, 1 page, available prior to Oct. 12, 2007.

Navistar International, Navistar International Pressure Governor, 14 pages, available prior to Oct. 12, 2007.

Operating the Detroit Diesel Electronic Fire Commander (EFC), 7 pages, available prior to Oct. 12, 2007.

Fire Research Corporation, Governors and Engine Throttles Overview, printed from internet address: http://www.firesearch.com/governors.php on Jan. 2, 2007, 2 pages, available prior to Oct. 12, 2007.

Fire Research Corporation, PROS Pressure Governor, PRO-S Rev0404, 25 pages, available prior to Oct. 12, 2007.

Fire Research Corporation, PumpBoss Pressure Governor with Display and Monitoring System, Model: PBA100, PBA100 Rev0806, 35 pages, available prior to Oct. 12, 2007.

Fire Research Corporation, InControl Pressure Governor, Engine Monitoring, and Master Pressure Display, TGA100 Rev0106, 35 pages, available prior to Oct. 12, 2007.

* cited by examiner

PRESSURE CONTROL SYSTEM AND METHOD

BACKGROUND

The present invention relates generally to the fields of pumping systems and pressure control systems and methods. The present invention more particularly relates to the field of vehicle-installed pressure control systems and methods.

Vehicle-installed pumping systems controlled by pressure control systems and methods present a number of challenges for engineers and manufacturers. Attempting to address one issue may give rise to other issues, challenges, or hurdles.

SUMMARY

One embodiment of the invention relates to a vehicle. The vehicle includes an engine and a liquid pump configured to pump liquid from a liquid intake system to an outlet. The vehicle further includes a pressure control system operably coupled to the engine via a communication connection, the pressure control system receiving a first signal from the engine representing engine speed. The pressure control system is configured to cause the liquid pump to change pumping pressure without changing the engine speed, and wherein the pressure control system is configured to cause the liquid pump to change pumping pressure without changing the engine speed when the pressure control system makes a determination relating to the engine speed.

Another embodiment relates to a pressure control system for a vehicle. The pressure control system has a liquid pump and an engine. The pressure control system includes an engine interface configured to receive a first signal representing speed of the engine. The pressure control system further includes a transducer input configured to receive a second signal representing output pressure of the liquid pump. The pressure control system yet further includes a processor configured to cause the pressure output of the liquid pump to change using the first signal and the second signal, the processor causing the adjustment of a component other than the engine.

Yet another embodiment relates to a method for providing a vehicle having an engine that provides energy to a fluid delivery system. The method includes providing a pressure control system to the vehicle and operatively coupling the pressure control system to the engine and the fluid delivery system, the pressure control system being configured to complete the steps of: (a) sending a first signal to the fluid delivery system, the first signal representing a command to cause the fluid delivery system to increase liquid output pressure; (b) determining the liquid output pressure is not increasing as expected given the sent first signal; (c) receiving a second signal representing engine speed at a pressure control system; (d) using the pressure control system to determine that the engine is operating at a relatively high speed and causing a low supply indication to be communicated from the pressure control system.

Another embodiment relates to a pressure control system on a vehicle having a liquid pump including an intake coupled to a liquid source. The pressure control system includes an input configured to receive a first signal representing pressure at the intake from the liquid source. The system further includes an output coupled to a variable displacement hydraulic pump, the variable displacement hydraulic pump configured to provide mechanical energy to a fixed displacement hydraulic motor, the fixed displacement hydraulic motor providing mechanical energy to the liquid pump. The system yet further includes a processor configured to controllably reduce the displacement of the variable displacement hydraulic pump via a second signal sent to the output when the processor determines that the first signal received at the input represents positive intake pressure.

Yet another embodiment relates to a fluid delivery system for providing pumping pressure on a vehicle having an engine that provides mechanical energy to the fluid delivery system. The fluid delivery system includes a pressure control system configured to receive a first signal representing engine speed, the pressure control system being further configured to receive a second signal representing liquid output pressure, wherein the pressure control system is configured to maintain a target pumping pressure when engine speed is changing, the pressure control system using the first signal and the second signal to compensate for the changing engine speed.

Alternative exemplary embodiments relate to other features and combinations of features as may be generally recited in the claims.

BRIEF DESCRIPTION OF THE FIGURES

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Before turning to the figures which illustrate the exemplary embodiments in detail, it should be understood that the application is not limited to the details or methodology set forth in the following detailed description or illustrated in the figures. It should also be understood that the phraseology and terminology employed herein is for the purpose of description only and should not be regarded as limiting.

Figure 1:
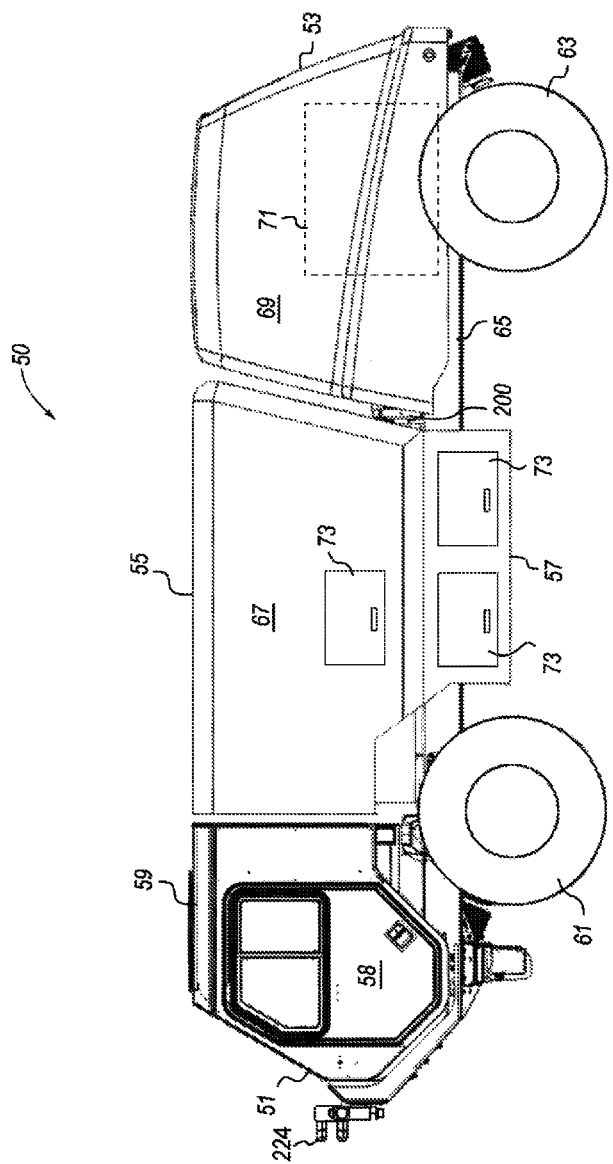
FIG. 1 is a side elevation view of a firefighting vehicle according to an exemplary embodiment.

Referring generally to FIG. 1, a vehicle is shown according to an exemplary embodiment. The vehicle is shown as a firefighting vehicle 50 which is configured to deliver a firefighting agent, such as water, foam, and/or any other fire suppressant to an area of interest (e.g., building, environmental area, airplane, automobile, another firefighting vehicle, etc.) using a vehicle fluid delivery system. Vehicle 50 generally comprises a chassis, a cab supported at a front portion of the chassis, a body supported by the chassis rearward of the cab, a drive system for operating the vehicle and/or one or more systems thereof, and a fluid delivery system. The fluid delivery system generally includes a fluid supply system, a fluid discharge system, a fluid conduit system, and a pump system for pressurizing and/or displacing a firefighting fluid or other agent.

Before discussing the details of the firefighting vehicle 50, it should be noted at the outset that references to "front," "back," "rear," "upper," "lower," "right," and "left" in this description are merely used to identify the various elements as they are oriented in the FIGURES, with "front," "back," and "rear" being relative to the direction of travel of the vehicle. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature. In the context of the hydraulics systems used in vehicle 50, coupling generally means coupling components in fluid communication.

Referring further to FIG. 1, vehicle 50 is a self-propelled firefighting vehicle having a front 51, a rear 53, a top 55, a bottom 57 and a pair of opposite sides, including a driver side or left side 58 and a passenger side or right side (not shown). Vehicle 50 is further shown as including a cab 59, motive members 61 and 63, a chassis or frame 65, a forward body portion 67, a rear body portion 69, a drive system 71, and a fluid delivery system 200.

Frame 65 supports the functional components of vehicle 50 including, but not limited to, front and rear motive members 61 and 63. Front and rear motive members 61 and 63 generally comprise ground motive members configured to propel or move vehicle 50. According to the embodiment illustrated, motive members 61 and 63 comprise wheels coupled to axles. According to various alternative embodiments, motive members 61 and 63 may comprise any other suitable mechanism for engaging a ground, track, or other surface so as to propel or suspend vehicle 50. For example, motive members 61 and 63 may comprise movable tracks such as commonly employed on tanks and some tractors. Although motive members 61 and 63 are illustrated as being similar to one another, one set of motive members may alternatively be differently configured than motive members 61 and 63. For example, front motive members 61 may comprise wheels while rear motive members 76 may comprise tracks. Additionally, vehicle 50 may be an all-wheel drive vehicle designed to provide driving power to all motive members or all axles of the vehicle. The vehicle 50 may have significant off-road capabilities, and may further be designed for airport rescue services. The size and weight of the vehicle may be optimized for commercial use and/or military use.

Frame 65 generally comprises one or more structures configured to serve as the base or foundation (i.e., support structure) for the remaining components of vehicle 50. Frame 65 extends in a fore and aft direction an entire length of vehicle 50 along a longitudinal center line of vehicle 50. Frame 65 may generally include a pair of parallel longitudinally extending frame members or frame rails which are joined by one or more transversally extending cross members. Frame rails are configured as elongated structural or supportive members (e.g., beams, channels, tubing, etc.). The frame rails are spaced apart in a lateral direction to define a void or cavity. The cavity may provide a space for effectively mounting or otherwise supporting components of vehicle 50. According to various alternative embodiments, frame 65 may have any of a variety of suitable configurations.

Cab 59 is supported by frame 65 and functions as an operator and/or occupant compartment for vehicle 50 by providing an enclosure or area suitable to receive an operator and/or occupant of the vehicle. One or more access openings (e.g., doors, etc.) are provided in either, or both, of the left side or right side of vehicle 50 to provide a means for ingress and egress. Although not shown, cab 59 includes controls associated with the manipulation of vehicle 50 (e.g., steering controls, throttle controls, etc.) and may optionally include controls or control systems associated with one or more auxiliary components of the vehicle 50 (e.g., foaming systems, pump systems, aerial ladders, turrets, etc.). According to an exemplary embodiment, cab 59 includes a control system configured to allow the selection of at least two substantially different pumping flow pressures. Cab 59 may also include controls to finely and variably control either of the two or more pumping flow pressures. Cab 59 may also include a bumper turret 224 where the bumper turret 224 is mounted to the front face 51 of the vehicle 50. The front-mounted bumper turret 224 may allow an operator within the cab 59 to manipulate the discharge of firefighting agent or fluid to an area of interest while remaining inside the cab 59. This configuration may advantageously provide some measure of safety for the operators of the vehicle 50 without sacrificing control. In other embodiments, the bumper turret 224 may be mounted to any portion or location of vehicle 50.

Vehicle 50 is further shown as including body portions 67 and 69. Body portions 67 and 69 generally comprise the portion of the vehicle 50 which forms an exterior of vehicle 50 rearward of cab 59 and which is configured for storing or otherwise supporting various components of vehicle 50, such as compressed air foam systems ("CAFS"), storage tanks, firefighting equipment (e.g., warning lights, hoses, nozzles, ladders, tools, etc.), and/or for providing an area for supporting one or more emergency response personnel (e.g., firefighters, etc.). Body portions 67 and 69 may be formed of one or more compartmentalized sections having access doors 73 as shown in FIG. 1. According to various alternative embodiments, body portions 67 and 69 may be provided as any number of structures depending on the particular application (e.g., water tank, flat bed, etc.). Body portions 67 and 69 may also contain one or more access doors 73. Access doors 73 may include a body panel, a hinge, and a handle. Access doors 73 may provide access to control panels, compartments, fire hose connectors (inlet and/or outlet fire hose connectors, etc.), fire hoses, general firefighting gear, valves of the pump system, or access to any other system mechanism.

Vehicle 50 also comprises one or more firefighting agent tanks or other containers configured to store one or more firefighting agents such as water, foam, fluid chemicals, dry chemicals, etc. According to an exemplary embodiment, the fluid supply system comprises a relatively large water tank (not shown) and a smaller foam tank. The water tank of the fluid supply system may be configured to hold between approximately 300 gallons of water and approximately 3500 gallons of water, while the foam tank may be configured to hold between 10 gallons of liquid foam concentrate and approximately 300 gallons of liquid foam concentrate. According to an exemplary embodiment, the water tank is a substantially rectangular vessel supported by frame 65 rearward of cab 59 within a body portion 67 and/or 69. According to various alternative embodiments, the storage system may be positioned at other locations of vehicle 50, may have a greater or lesser capacity than those disclosed herein, and may have any of a number of suitable configurations.

To facilitate the operation of vehicle 50 and components thereof, drive system 71 is provided. Drive system 71 of vehicle 50 provides the power to operate vehicle 50 and certain components of vehicle 50 as well as the structure for transmitting the power to one or more motive members 61, 63, and other components of vehicle 50. Drive system 71 generally comprises a power source or prime mover and a motion transfer device. The prime mover, usually an engine, generally comprises a source of mechanical energy (e.g., rotational movement, etc.) which is derived from an energy source (e.g., a stored energy source, etc.). Examples of suitable prime movers include, but are limited to, an internal combustion gas-powered engine, a diesel engine, a turbine, a fuel cell driven motor, an electric motor or any other type of motor capable of providing mechanical energy.

Any of the above mentioned prime movers may be used alone or in combination with one or more additional power sources (as in a hybrid vehicle) to provide mechanical energy. According to one exemplary embodiment, the engine is an internal combustion engine. According to various alternative embodiments, the drive system 71 may be selected from any suitable prime mover that is, or may become, commercially available, or the prime mover may be specifically configured for use with vehicle 50.

The motion transfer device (e.g., a transmission, etc.) is coupled to a first power output of the engine and ultimately (in combination with other components) transfers the power and rotational mechanical energy received from the engine to motive members 61, 63, which in turn propel vehicle 50 in a forward or rearward (or other) direction. The transmission may be coupled, directly or indirectly, to motive members 61, 63, a wheel end reduction unit, and/or a series of motion transfer devices such as shafts, joints, differentials, etc. that are coupled together to transfer the power or energy provided by the engine to the motive members 61, 63. The transmission may be any of a variety of suitable transmissions (e.g., standard, split shaft, etc.). According to one exemplary embodiment, the transmission is an automatic transmission.

According to an exemplary embodiment, the engine further comprises a second power output. The second power output is configured to provide rotational mechanical energy whenever the engine is providing rotational mechanical energy. The second power output may be a power take-off device (e.g., power divider, etc.). The power take-off device may be a drive which comprises a source of rotational energy (secondary to the primary crankshaft) for operating one or more components of vehicle 50. The power take-off device may operate whenever the engine is operating (i.e., while moving the truck or not). Moreover the power take-off device may provide power to one or more components of vehicle 50 regardless of engine speed. According to an exemplary embodiment, the power take-off device (e.g., power divider, etc.) is used to drive the components and subsystems of vehicle fluid delivery system 200. According to various other embodiments, vehicle fluid delivery system 200 may be driven by any other suitable source of energy including, but not limited to, a secondary motor.

Vehicle fluid delivery system 200 is generally located in the middle of the vehicle 50 and may be located outside of the left hand frame-rail underneath the water tank. Components relating to the vehicle fluid delivery system are disposed throughout the body, cab, and frame of vehicle 50. According to other exemplary embodiments, fluid delivery system 200 is located at any position on the vehicle 50 and may exist at any location relative to the frame 65, cab 59, and body portions 67, 69.

Figure 2:
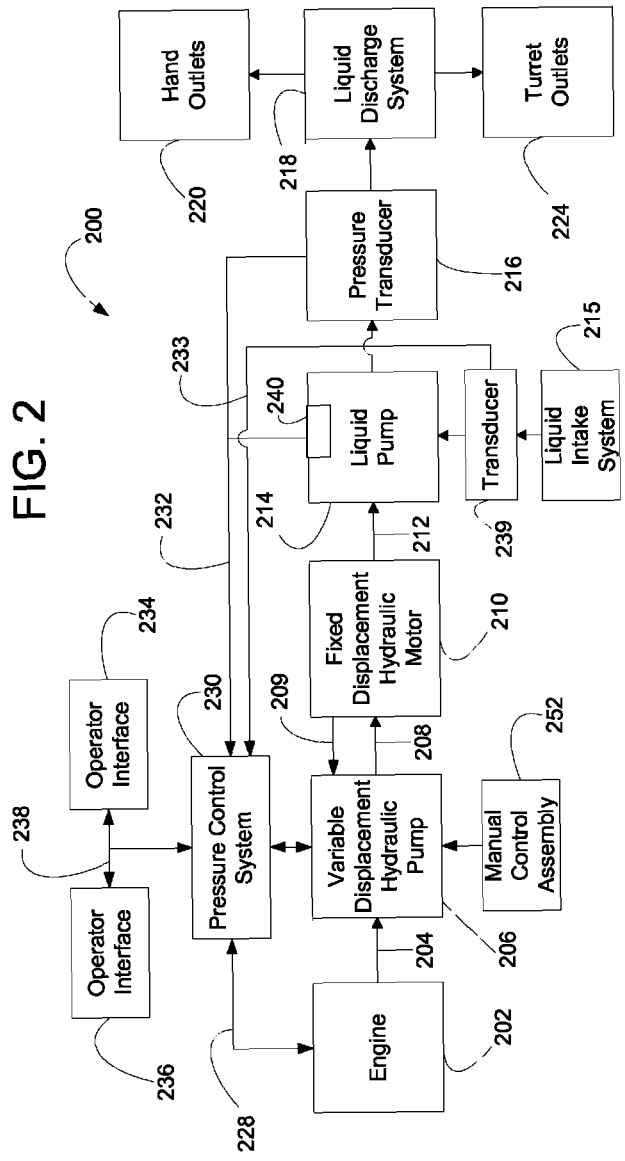
FIG. 2 is a block diagram of a fluid delivery system according to an exemplary embodiment.

Referring now to FIG. 2, a block diagram of fluid delivery system 200 is shown, according to an exemplary embodiment. Fluid delivery system 200 generally includes (or interfaces with) engine 202, a hydraulic pump 206, a fixed displacement hydraulic motor 210, a liquid pump 214, a liquid discharge system 218, outlets 220, 224, pressure control system 230, and one or more operator interfaces 234, 236.

Engine 202 may be or include any number of prime movers discussed above or otherwise (e.g., an internal combustion gas-powered engine, a diesel engine, a turbine, a fuel cell driven motor, an electric motor or any other type of motor capable of providing mechanical energy, etc.). Engine 202 provides mechanical energy to drive shaft 204. Drive shaft 204 is coupled to and provides mechanical energy to variable displacement hydraulic pump 206. Hydraulic pump 206 provides fluid driving force to fixed displacement hydraulic motor 210 via hydraulic line 208 (e.g., high pressure hydraulic line). Line 209 returns fluid from hydraulic motor 210 to hydraulic pump 206. A drive shaft 212 extending from fixed displacement hydraulic motor 210 drives liquid pump 214. Liquid pump 214 takes liquid (e.g., water, chemicals, a foam/water mix, etc.) from liquid intake system 215 and forwards the liquid to liquid discharge system 218 and/or hand outlets 220, turret outlets 224.

Pressure control system 230 receives signals representative of pressure from pressure transducer 216, pressure transducer 240, and/or any number of additional or alternative devices configured to communicate pressure downstream of liquid pump 214 to pressure control system 230. Pressure transducers 216 and/or 240 may be implemented using any suitable technique or technology (e.g., mechanical deflection, piezoresistive pressure sensors, etc.) for measuring fluid pressure and communicating the measurement to pressure control system 230. Pressure transducers 216 and/or 240 may communicate the measurement to pressure control system 230 via connection 232 or otherwise using any type of suitable wired, wireless, digital, and/or analog technology.

Transducer 239 may be provided upstream of liquid pump 214 and is shown in FIG. 2 as provided between liquid intake system 215 and liquid pump 214. Transducer 239 is generally a pressure transducer (e.g., a vacuum transducer) configured to determine intake pressure and to communicate a signal representing intake pressure to pressure control system 230. Transducer 239 may communicate the signal to pressure control system 230 via connection 233 or otherwise using any type of suitable wired, wireless, digital, and/or analog technology. According to an exemplary embodiment, transducer 239 is not a part of fluid delivery system 200. According to other exemplary embodiments, fluid delivery system 200 includes multiple transducers 239 (of varying types or otherwise) upstream of liquid pump 214.

Operator interfaces 234 and 236 may be communicably coupled (e.g., electronically via a digital connection, electronically via an analog connection, wirelessly, optically, etc.) to pressure control system 230 such that operator interfaces 234, 236 may be used to provide input to pressure control system 230 and/or to provide displays or indications of system status. According to an exemplary embodiment, operator interface 234 is located in the cab 59 (shown in FIG.

1) while operator interface 236 is located rearward of the cab (e.g., on the chassis near the hand pumps, near an intake valve of liquid intake system 215, etc.). According to yet other exemplary embodiments, operator interfaces 234, 236 may be located at any spot or location near or around the vehicle.

Liquid discharge system 218 may be or refer to any of a number of liquid discharge systems including a simple hose or line network to a complex valving and line network (perhaps coupled to a pump panel) designed to control and/or accommodate many output lines that feed liquid to one or more hand outlets 220, one or more turret outlets 224, and/or any number of additional (or alternative) outlets. For example, liquid discharge system 218 (and/or hand outlets and turret outlets) may include or feed a foam system, a chemical additive system, a deluge gun, a ladder-mounted gun, any number of crosslay hoses, booster lines, nozzles, etc.

Connection 228 from engine 202 to pressure control system 230 is a controller area network ("CAN") connection, according to an exemplary embodiment. According to yet other exemplary embodiments, connection 228 may be any suitable communication connection of the past, present, or future capable of communicating signals to pressure control system 230. For example, connection 228 might be a vehicle data bus connection, a serial bus connection, a parallel bus connection, a twisted pair connection, an optical connection, a wireless connection, etc. According to yet other exemplary embodiments, connection 228 is an International Standards Organization connection (e.g., ISO 11898-2, ISO 11898-3, ISO 11898-4, ISO 11992-1, ISO 11783-2, etc.) or a Society of Automotive Engineers connection (e.g., SAE J1939, SAE J1939-11, SAE J1939-15, SAE J2411, etc.).

Using connection 228, engine 202 communicates signals to pressure control system 230 representing the speed of the engine (e.g., in revolutions per minute ("RPM")). The signals representing RPM may be representative of (nearly) instantaneous RPM, smoothed (e.g., averaged) RPM, or otherwise. Pressure control system 230 generally uses the signals representing engine speed to control the operation of fluid delivery system 200.

Figure 3:
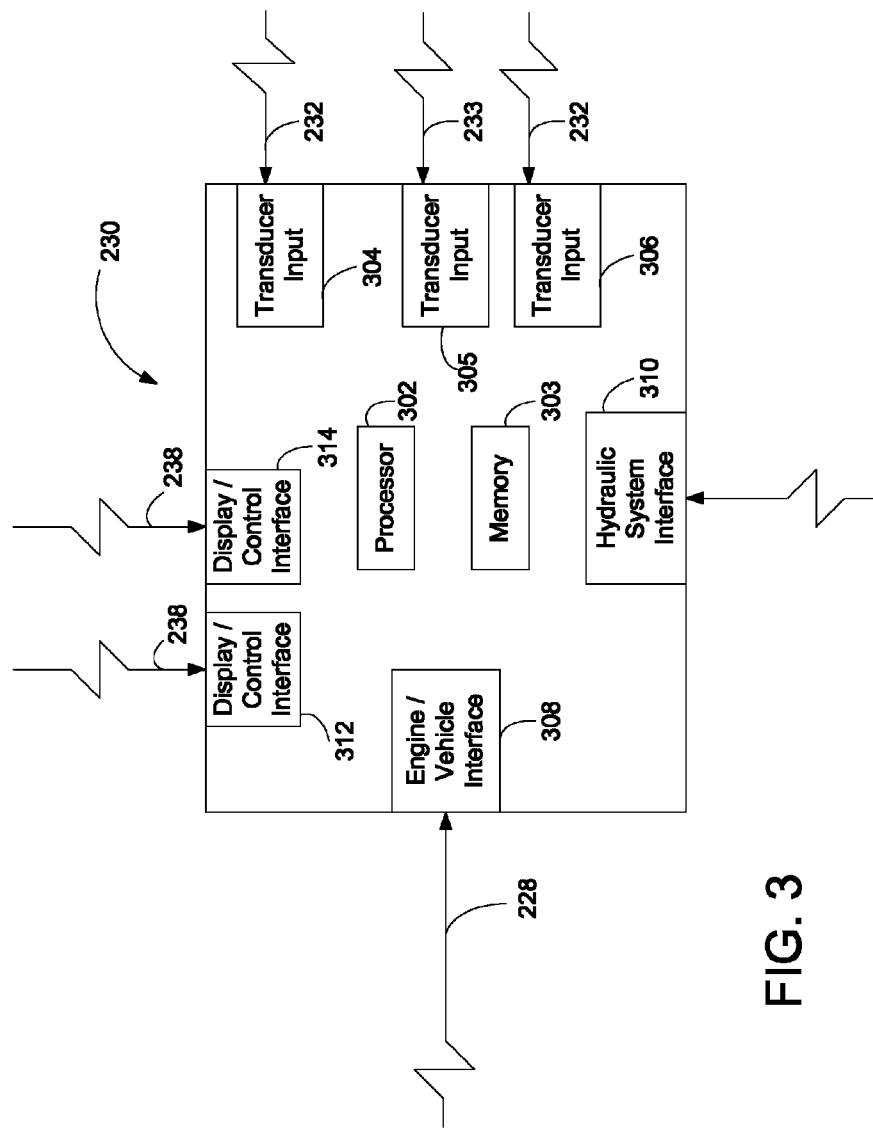
FIG. 3 is a block diagram of a pressure control system according to an exemplary embodiment.

Referring to FIG. 3, a detailed view of pressure control system 230 is shown, according to an exemplary embodiment. Pressure control system 230 may generally be an electronic control unit suitable for performing the tasks described herein. For example, pressure control system 230 may be an embedded system, a dedicated circuit, a general purpose system programmed with the activity described herein, a plurality of control units, etc. Pressure control system 230 may include a processor 302, memory 303, transducer input 304, transducer input 305, transducer input 306, engine/vehicle interface 308, hydraulic system interface 310, display/control interface 312, display/control interface 314, etc.

Processor 302 may be a single processor or a group of processors. Processor 302 may be any processor suitable of being configured and/or programmed with the control activity described herein. Processor 302 may be a microprocessor, a field programmable gate array (FPGA), an application specific integrated circuit (ASIC), a complex programmable logic device (CPLD), a programmable logic device, and/or any other suitable device(s) of the past, present, or future. Processor 302 may include any number of sub-processors or coupled processors (e.g., display processors, communications processors, digital signal processors, etc.). Processor 302 may utilize memory 303 to store and/or retrieve data, instructions, program code, and/or information. Memory 303 may be violate memory, non-violate memory, and/or any other suitable memory device of the past, present or future. Processor 302 may directly communicate with any of the other components of pressure control system 230, may facilitate communication between the components, or otherwise.

Transducer input 304, 305, and/or 306 are shown as interfaces for communicably coupling lines 232, 233 to transducers 216, 239, and/or 240 (transducers shown in FIG. 2). According to an alternative embodiment, transducer inputs 304, 305, and/or 306 may be coupled to one or more transducers, sensors, intermediate devices, and/or networks wirelessly. Transducer inputs 304, 305, and/or 306 may include a jack or other hardware for physically coupling a line or connector to pressure control system 230, communications hardware/software, a digital to analog converter, an analog to digital converter, a circuit for interpreting signals representing pressure, and/or another suitable component.

Engine/vehicle interface 308 is shown as an interface for communicably coupling connection 228 (and thereby engine 202) to pressure control system 230. Engine/vehicle interface 308 may be any hardware and/or software compatible with connection 228. Engine/vehicle interface 308 may include a jack, a solder point, and/or other hardware for physically coupling connection 228 to pressure control system 230, communications hardware/software, a digital to analog converter, an analog to digital converter, a circuit for interpreting signals representing RPM, and/or another suitable component.

Hydraulic system interface 310 is an interface for communicably coupling pressure control system 230 to hydraulic pump 206. Hydraulic system interface 310 and/or hydraulic pump 206 include a hydraulic control system (e.g., one or more suitable circuits, controllable valves, actuators, etc.). Hydraulic system interface 310 receives command signals from processor 302 (or another component of pressure control system 230) and forwards control signals to variable displacement hydraulic pump 206 so that the displacement of hydraulic pump 206 may be controllably changed by pressure control system 230. According to an exemplary embodiment, control system 230 is configured to controllably change the displacement (e.g., by controllably driving a pump displacement solenoid) of hydraulic pump 206 so that the flow of oil (or another hydraulic fluid or gas) provided from hydraulic pump 206 to hydraulic motor 210 is also controllably varied by the pressure control system. According to various exemplary embodiments, the connection between pressure control system 230 and hydraulic pump 206 may be bi-directional (e.g., pressure control system 230 may be configured to receive and/or interpret one or more feedback signals from hydraulic pump 206). Pressure control system 206 may use the feedback signals to determine the status of hydraulic pump 206 (e.g., the current amount of displacement, whether maximum displacement has been reached, etc.).

Display/control interfaces 312, 314 may be coupled to operator interfaces 236, 234 via connection(s) 238. Connections 238 may be wireless, wired, bidirectional, analog, digital, and/or any other suitable connections capable of supporting the communication of information or signals to/from pressure control system 230 and operator interfaces 236, 234 herein described. According to an exemplary embodiment only one display/control interface is provided and/or only one operator interface is provided. Display/control interfaces 312, 314 may include any number of physical components (e.g., jacks, solder points, etc.) that couple pressure control system 230 to connections 238. Display/control interfaces 312, 314 may also include a transceiver, a digital to analog converter, an analog to digital controller, communications hardware/software, one or more control devices, etc. Further, each display/control interface 312, 314 may include a plurality of separate jacks, connections, interfaces, etc. For example, one sub-interface may be used to provide a video signal to a display or separate display driver while another sub-interface may be used to provide an I/O connection to other human-machine interface components (e.g., a keyboard, a button or an array of buttons, a tactile control, a touch screen, etc.).

Figure 4:
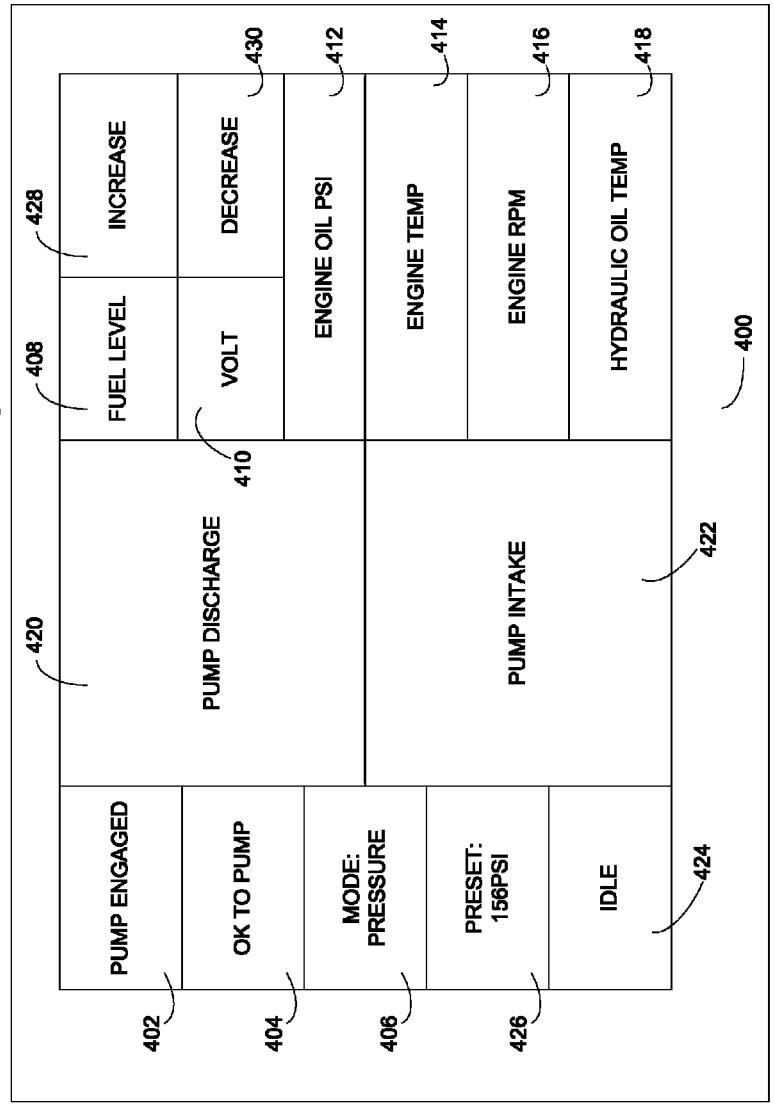
FIG. 4 is a representation of an operator interface for use with a pressure control system according to an exemplary embodiment.

Referring to FIG. 4, operator interface 400 (which could be operator interface 234 or 236 of FIG. 2), or a display screen state thereof, is shown, according to an exemplary embodiment. Operator interface 400 may be a touch screen device or a screen for providing video output (the interface also including hardware buttons or other human-machine interface hardware). According to yet other exemplary embodiments, operator interface 400 may also or alternatively include a number of indicators that are not video display indicators.

Operator interface 400 includes a number of video display elements or indicators. A pump engaged indicator 402 may display or illuminate (e.g., in green) once the pump is engaged (e.g., once the vehicle power take-off has been engaged). Indicator 404 may display or illuminate "ok to pump" once a series of conditions are determined by the pressure control system to be met (e.g., the vehicle power take-off has been engaged, the vehicle's transmission is in neutral, the vehicle's parking brake is activated, the vehicle's high idle mode has been engaged, etc.). Indicator 404 may display different status messages. For example, indicator 404 may display "ok to pump and roll" once a series of conditions are determined by the pressure control system to be met (e.g., the vehicle power take-off has been engaged, the vehicle's transmission is in gear, the vehicle parking brake is not activated, etc.).

Indicator 406 displays or illuminates the mode setting. Indicator 406 may also be a button or other control that allows a user to toggle between a "pressure" mode and a "manual" mode. In pressure mode, pressure control system 230 is configured to receive feedback from an intake transducer (e.g., part of liquid intake system 215, transducer 239, etc.) and/or a transducer downstream of the liquid pump (e.g., pressure transducer 216, transducer 240) and is further configured to automatically adjust hydraulic pump 206 (e.g., via a pump displacement solenoid) to match the desired pressure set by the user (or otherwise). In manual mode, pressure governor 230 adjusts the pump displacement solenoid with feedback from the system only if explicitly commanded to take such action (e.g., by a user commanding the system to increase pressure or decrease pressure).

Indicator 408 is configured to display an indication of fuel level (e.g., a digital indication in a format ranging from 0% to 100%, a flash, a warning indicator or light when the level is below one quarter of a tank, etc.). Indicator 410 is configured to display an indication of the electric potential across a power source (e.g., the vehicle's power system, an auxiliary power system, a battery system, or otherwise, etc.). Indicator 412 is configured to display an indication of engine oil pressure (e.g., a digital indication, a warning indication if engine oil pressure is determined to be low, etc.). Indicator 414 is configured to display an indication of engine temperature (e.g., engine water temperature, temperature in a digital format, etc.). Indicator 416 is configured to display a digital indication of engine speed (e.g., in revolutions per minute), as read via connection 228 shown in FIGS. 2 and 3 or otherwise. Indicator 418 is configured to display an indication of hydraulic oil temperature (as received by hydraulic system interface 310 shown in FIG. 3 or otherwise). Indicator 420 is configured to display an indication of pump discharge pressure (as determined by pressure transducers 216, 240 or otherwise). Indicator 420 is configured to display pump discharge pressure in a simple digital (or analog) format or may display a graph such as a bar graph for the user. Indicator 422 is configured to display an indication of pressure at the intake stage of liquid pump 214 (shown in FIG. 2) (as determined by pressure transducer 239 or otherwise). Indicator 424 may be a button or control element (e.g., area of a touch screen) that whereby once pressed (or otherwise activated by a user) the pressure control system causes the flow of liquid through the liquid pump to be restricted (e.g., by restricting the pumping activity of fluid delivery system 200, by reducing the flow of oil from the variable displacement hydraulic pump to the fixed displacement hydraulic motor, etc.).

Element 428 and 430 may be touch screen display elements, indicator areas (coupled with hardware controls elsewhere), buttons or otherwise and are intended to allow a user to command the pressure governor to increase (via element 428) or decrease (via element 430) pressure accordingly. According to an exemplary embodiment, if the system is in "pressure" mode (e.g., as set or indicated by indicator 406), a single "press" of the button for element 428 may increase the pressure in approximately 3 pounds per square inch (PSI) increments and may increase the pressure in approximately 75 PSI increments for every button hold. If the system is in "manual" mode, the pressure control system may cause the increase of pump displacement by approximately one percent for every push of element 428 and approximately twenty five percent if element 428 is held for a period of time. It should be apparent that other increments are possible. Element 430 is intended to operate in the same or a different manner, but to decrease the output pressure of the liquid pump and/or decrease the displacement of the hydraulic pump. It should be apparent a variety of increments may be used during the decreasing activity. Elements 428 and/or 430 may be used to change the preset value (e.g., after element 426 and/or element 406 has been pressed or otherwise). According to various alternative embodiments, when a user presses element 426, a new user interface (or a control) is displayed that allows the user to adjust the preset value.

Element 426 may be a touch screen display element, an indicator area (coupled with hardware controls elsewhere), a button or otherwise and allows a user to command the pressure governor to automatically reach and maintain a predetermined pressure setting or pump displacement setting (e.g., solenoid position setting, valve setting, etc.). For example, referring to FIGS. 2-4, if a preset mode is activated using element 426, pressure control system 230 may cause liquid pump 214 to increase or decrease output pressure to match a stored preset value (e.g., without requiring the user to use element 428 or 430).

Figure 5:
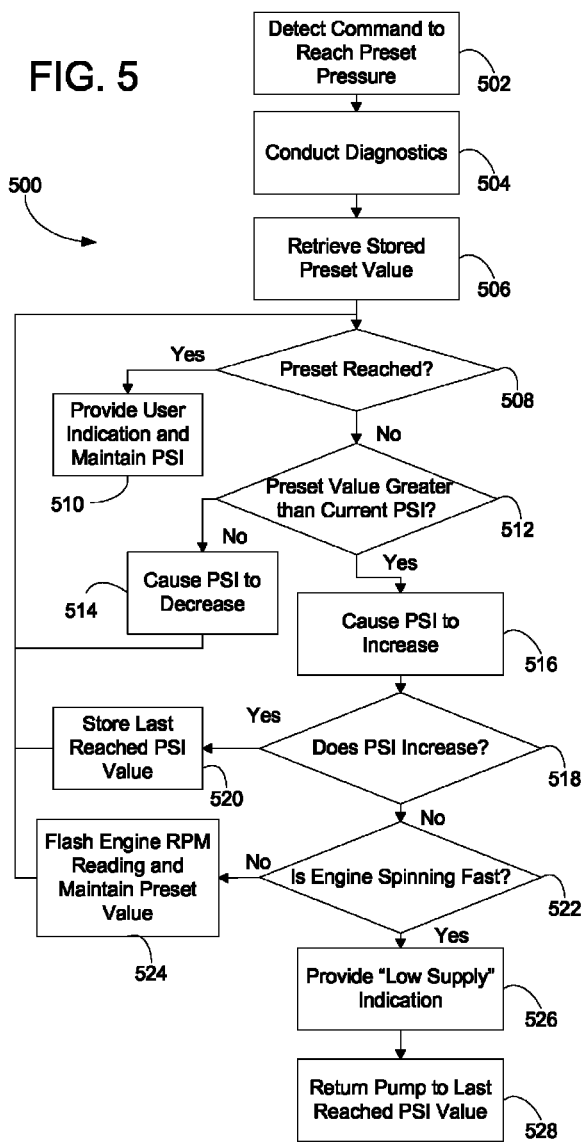
FIG. 5 is a flow chart for controlling pressure according to an exemplary embodiment.

Referring now to FIG. 5, a flow chart of a process 500 for providing pressure control is shown, according to an exemplary embodiment. Process 500 is shown to include detecting a command or signal to reach a preset (i.e., desired) output pressure (step 502). The command or signal is generated from within the pressure governor system, for example, when the pressure governor system is placed into an "automatic," "preset," or "pressure" mode via an operator interface. The command or signal may also be generated or sent from an operator interface when a user requests a pressure increase or pressure decrease. At any time before, during, after, or in parallel with process 500, the system may conduct diagnostics (step 504). Conducting diagnostics may include any number of engine checks, temperature checks, hydraulic system checks, intake pressure checks, liquid pump checks, or the like. The pressure control system may generate and output (e.g., display) any number of indications that a diagnostics check has failed or has generated a warning.

Referring still to FIG. 5, the pressure control system retrieves a stored preset value (step 506) (e.g., a preset stored in memory 303 shown in FIG. 3) relating to a target or desired pressure for the fluid delivery system to reach or maintain. Now, or at a variety of additional or alternative times during process 500, the system determines whether or not the preset has been reached (step 508). If the preset has been reached, the system provides the user with an indication and take steps necessary to maintain the preset (step 510) pressure value. Maintaining the preset pressure value may include beginning a new process or looping back to "preset reached?" (step 508) on a regular or irregular interval. If the preset is not reached, the system may determine whether or not the preset value is greater (step 512) than the current pressure value (e.g., as indicated by an actual pressure signal from a pressure transducer). If the preset value is not greater than the current pressure value, the system may cause the liquid output pressure to decrease (step 514). Causing the liquid output pressure to decrease may include any number of steps configured to cause the engine speed to decrease, to cause the displacement of the hydraulic pump to decrease, to cause the flow of hydraulic oil to the hydraulic motor to decrease, and/or any other activity of the system that causes the liquid output pressure to decrease. According to various exemplary embodiments, the pressure control system is configured to cause the liquid pump to change pumping pressure without changing (or immediately or directly changing) engine speed.

Referring still to FIG. 5, if in step 512 the system determines that the preset value is greater than the current liquid output pressure, the system may conduct any number of activities configured to cause liquid output pressure to increase (step 516). Step 516 may include sending a signal to the engine commanding the engine to speed up, or sending a signal to the liquid pump commanding it to speed up, or sending a signal to the hydraulic control system and/or hydraulic pump so that the hydraulic motor speeds up (e.g., by increasing the flow of oil to the hydraulic motor), and/or any other activity that causes the liquid output pressure to increase. According to various exemplary embodiments, the pressure control system is configured to cause the liquid pump to change pumping pressure without changing (or immediately or directly changing) engine speed.

Referring further to FIG. 5, after (or while) the system is attempting to cause the liquid output pressure to increase via step 516, the system determines whether or not the liquid output pressure increased (step 518). Determining whether the liquid output pressure increased may be based upon a threshold determination, an expected rate of increase, an increase relative to the activity taken in an attempt to affect the increase, or other suitable methods. If the liquid output pressure increases (or increases as expected), the system may store the last reached liquid output pressure value in memory (step 520) and loop back to step 508 to continue the increasing process. If the liquid output pressure does not increase (or does not increase as expected), the system then determines whether the engine is spinning fast (step 522). The determination of step 522 may be completed based on a variety of methods. For example, the system may determine that the engine is spinning fast if it is spinning at faster than 1200 RPM. According to yet other exemplary embodiments, the system may determine that the engine is spinning fast if it is spinning at some higher value, a lower value, a percentage of capacity, or the like. According to some exemplary embodiments, determining step 522 determines whether the engine is being taxed (while considering additional and/or alternative variables to speed)(e.g., considering engine temperature, considering the fuel being injected into the engine, etc.). If the engine is not spinning fast, the system may flash or otherwise indicate the engine speed (RPM or another indicator) and maintain the preset value (step 524) (i.e., continue attempting to reach the preset value by looping back to step 508).

Referring further to FIG. 5, if the engine is determined to be spinning fast (or otherwise taxed) and the liquid output pressure has not increased or is not increasing as expected, then the system may determine that the preset pressure cannot be achieved because of a low intake supply pressure condition (or otherwise). The system may provide a "low supply" indication via an operator interface, another display, and/or audibly (step 526). The system may then return the fluid delivery system and/or its components to any states necessary to return the pump to the last reached liquid output pressure value stored in memory (step 528). Step 528 may also include substituting the stored preset value with the last reached value and looping back to step 508 so that the last reached value is the new preset and the system will work to reach and/or maintain the last reached value. If the last reached value cannot be maintained, the system may take action to decrease liquid output pressure until the engine is not spinning fast and/or until a pressure value is comfortably maintained by the system (whether the engine is spinning fast or not).

Figure 6A:
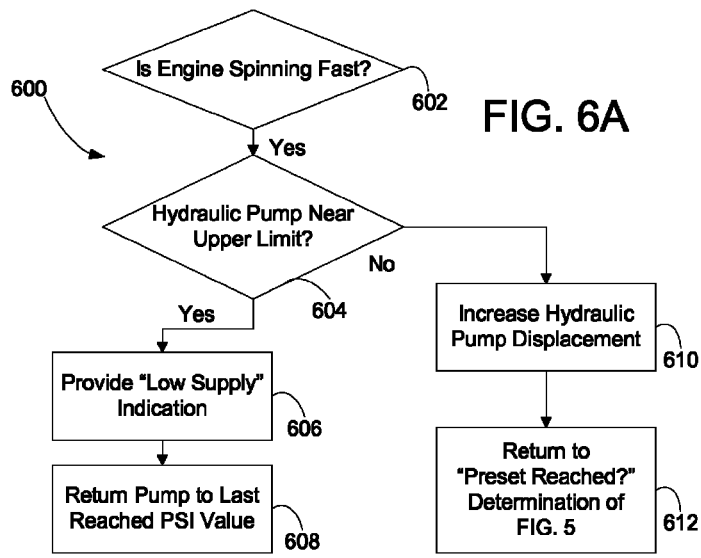
FIG. 6A is a flow chart of a process for controlling pressure according to an exemplary embodiment.

Referring to FIG. 6A, a flow chart of a process 600 for providing pressure control is shown, according to an exemplary embodiment. Step 602, a determination of whether the engine is spinning fast (or otherwise being taxed) may correspond with step 522 or may be a part of another pressure setting, pressure maintaining, or pressure compensating process. The system determines whether the hydraulic pump is approaching or near an upper limit (step 604). If the hydraulic pump is not approaching or nearing the upper limit, the system may continue to increase hydraulic pump displacement (step 610) and/or take other steps to increase the displacement of the hydraulic motor (thereby increasing the liquid output pressure of the system) (e.g., increasing engine speed, increasing the flow of oil to the hydraulic motor, etc.). The system may then return or loop back to step 508 shown in FIG. 5 (step 612). If the hydraulic pump is near approaching or near an upper limit, the system provides a "low supply" indication to an operator interface, a display, an audio system, or otherwise (step 606). The system may then return to the last reached liquid output pressure value (step 608).

Figure 6B:
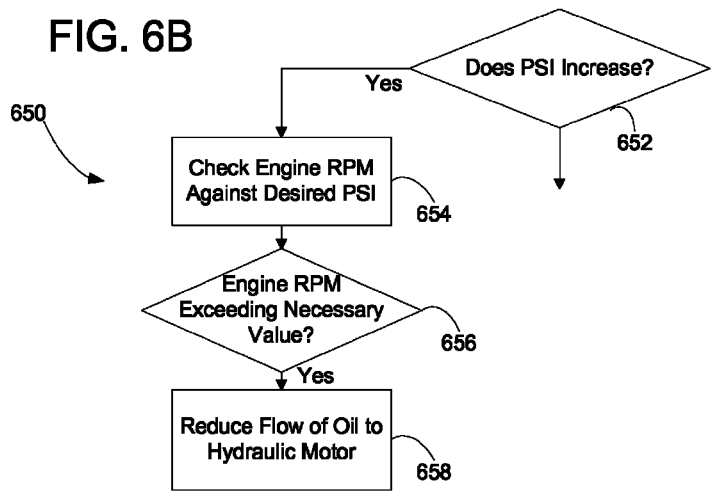
FIG. 6B is another flow chart of a process for controlling pressure according to an exemplary embodiment.

Referring to FIG. 6B, a flow chart of a process 650 for providing pressure control is shown. Step 652 shown in FIG. 6B may correspond to step 518 shown in FIG. 5 or otherwise. If liquid output pressure is determined to be adequately increased or increasing (determined by step 652), the pressure control system may use a signal representing engine speed and a signal representing current liquid output pressure to check or calculate a relationship between engine speed (e.g., revolutions per minute) and liquid output pressure (step 654). The system may then determine whether or not the engine speed is exceeding the engine speed that is necessary to reach a desired (i.e., target, preset, commanded) liquid output pressure (step 656). If the engine is exceeding the necessary revolutions per minute, the pressure control system causes the hydraulic pump system to reduce the flow of oil to the hydraulic motor (step 658). In this manner, the system begins to compensate for "overshoots" in engine speed and/or liquid pump pressure before they happen.

Figure 7A:
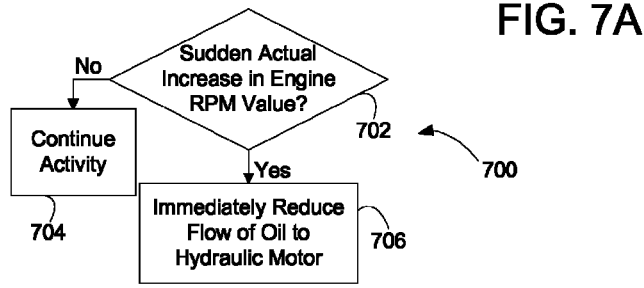
FIG. 7A is a flow chart of a process for controlling pressure according to an exemplary embodiment.

Referring to FIG. 7A, a flow chart of a process 700 for providing pressure control is shown. Process 700 may be run in parallel to any of the aforementioned processes, instead of any other process, may stand alone, and/or may be a part of a routine for maintaining liquid output pressure. The system determines whether a sudden actual increase in engine speed has been experienced by the system based on a received signal representing engine speed (step 702). Step 702 considers the magnitude of the increase, the rate of the increase, and/or any combination thereof. Step 702 compares the increase against a predefined absolute value, a target value, a percentage of the last known value, or otherwise. If a sudden increase is not experienced, the system continues its previous activity (step 704) which may include looping back to step 702 after some delay. If a sudden increase is detected in step 702, the pressure control system directs the reduction of the flow of oil to the hydraulic motor (step 706) by sending an appropriate control signal to a hydraulic control system or the hydraulic pump that drives the hydraulic motor. According to various exemplary embodiments, the pressure control system may decrease, begin decreasing, begin compensating, or the like by affecting another component of the fluid delivery system (e.g., the liquid pump, a transmission mechanism, etc.).

Figure 7B:
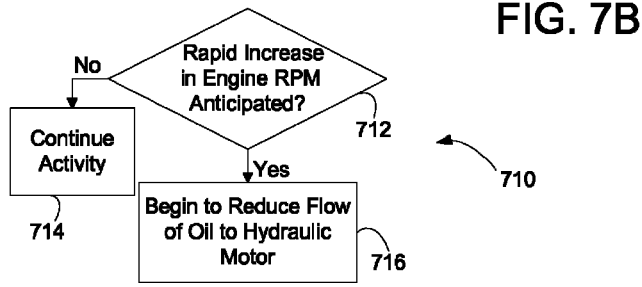
FIG. 7B is a flow chart of a process for controlling pressure according to an exemplary embodiment.

Referring to FIG. 7B, a flow chart of a process 710 for providing pressure control is shown. The system determines whether a rapid increase in engine speed is anticipated (step 712). Step 712 may be conducted by considering or executing any number of sub-steps. For example, step 712 may consider fuel system activity, operator activity, vehicle accelerator activity, or otherwise. If a rapid increase in engine revolutions per minute is not anticipated, the system continues whatever activity it was previously undertaking and/or loop back to step 712 or another step (e.g., step 508 of FIG. 5). If a rapid increase in engine speed is anticipated, the system begins to reduce the flow of oil to the hydraulic motor (step 716) by sending an appropriate control signal to a hydraulic control system, the hydraulic pump that drives the hydraulic motor, or otherwise. According to various exemplary embodiments, the pressure control system may decrease, begin decreasing, begin compensating, or the like by affecting another component of the fluid delivery system (e.g., the liquid pump, a transmission mechanism, etc.).

Figure 7C:
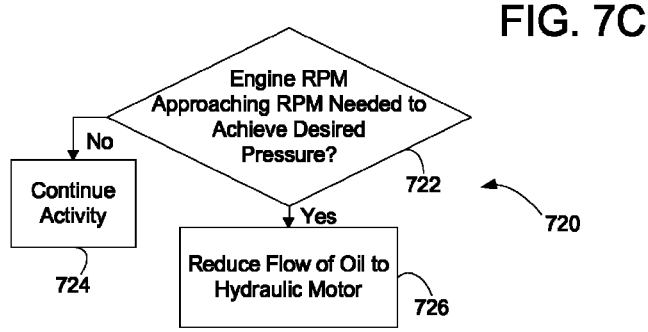
FIG. 7C is a flow chart of a process for controlling pressure according to an exemplary embodiment.

Referring to FIG. 7C, a flow chart of a process 720 for providing pressure control is shown. The system determines whether the engine speed is approaching the speed necessary to achieve (or maintain) the desired pressure (step 722). If the speed is not approaching a value needed to achieve a desired liquid output pressure, the system may continue the activity (step 724) it was undertaking prior to the determining task. If the engine speed is approaching a value needed to achieve a desired liquid output pressure, the system begins to reduce the flow of oil to the hydraulic motor (step 726) by sending an appropriate control signal to a hydraulic control system, the hydraulic pump that drives the hydraulic motor, or otherwise. According to various exemplary embodiments, the pressure control system may decrease, begin decreasing, begin compensating, or the like by affecting another component of the fluid delivery system (e.g., the liquid pump, a transmission mechanism, etc.).

Figure 8:
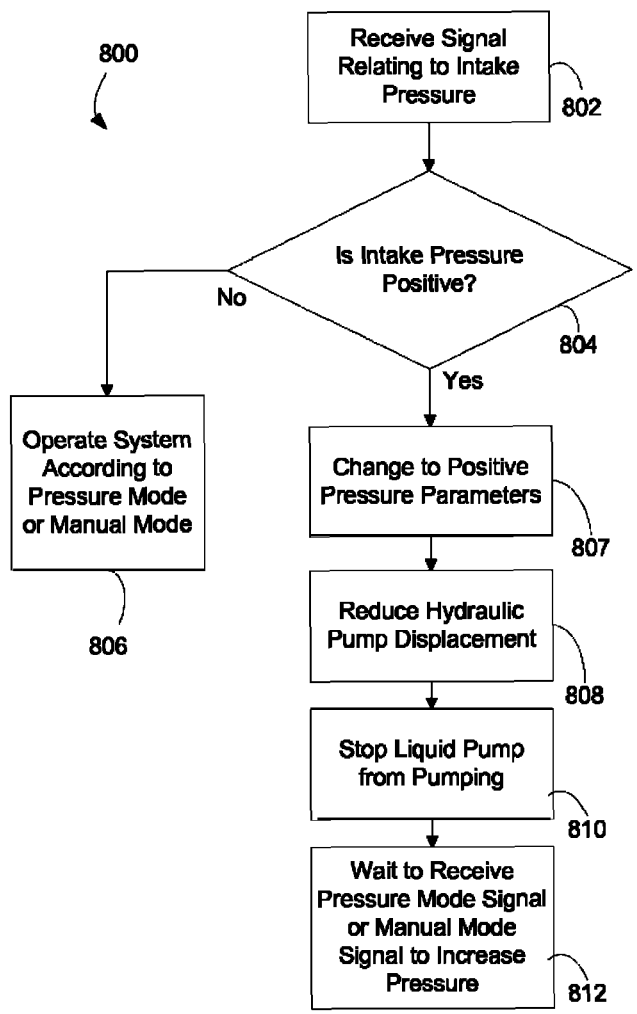
FIG. 8 is a flow chart of a process for controlling pressure according to an exemplary embodiment.

Referring now to FIG. 8, a flow chart of a process 800 for controlling pressure is shown, according to an exemplary embodiment. Process 800 (or various combinations of steps thereof) may be a part of any previous process (e.g., process 500 shown in FIG. 5, process 650 shown in FIG. 6B, etc.) or otherwise. Process 800 includes the step of receiving a signal relating to intake pressure (step 802). For example, pressure control system 230 shown in FIGS. 2 and 3 may receive a signal representing intake pressure from transducer 239 shown in FIG. 2. Process 800 further includes the step of determining whether intake pressure is positive (step 804). Step 804 may include any number of rounding, approximating, and/or filtering sub steps. For example, step 804 may average intake pressure over a period of time and return an indication that intake pressure is positive if intake pressure is averaging over five PSI and may otherwise return an indication that intake pressure is zero. If intake pressure is not determined to be positive during step 804, the system is shown to continue operating the system (step 806) according to pressure mode or manual mode. According to various exemplary embodiments, process 800 is used during an initiation or startup sequence and will cause liquid pump 214 to pump at a baseline or idle rate until instructed otherwise.

Referring further to FIG. 8, if intake pressure is determined to be positive, the system is shown to change to (and begin operating based on) positive pressure parameters (step 807). The system may store two more sets of pumping parameters in memory 303 shown in FIG. 3. For example, memory 303 may be configured to store a first set of pumping parameters relating to zero pressure (or close to zero pressure) and a second set of pumping parameters relating to positive pressure. When a determination of positive pressure is made during or after step 804, processor 302 (shown in FIG. 3) may retrieve the stored positive pressure parameters from memory 303 and take one or more steps to implement the positive pressure parameters. The one or more steps may include sending a zero current signal to a proportional valve configured to affect the displacement of the hydraulic pump. The zero current signal may cause the displacement of the hydraulic pump to be reduced (step 808) and/or brought to zero. According to other exemplary embodiments, the parameters of step 807 and the activity of the processor may otherwise cause the flow of oil to the hydraulic motor to be reduced so that the liquid pump in turn reduces its pumping pressure. According to various exemplary embodiments, the pressure control system will cause the liquid pump to stop pumping (step 810) if pressure is determined to be positive in step 804. The system is then shown to wait to receive a pressure mode signal or a manual mode signal to increase pressure (step 812). Used in this manner, the system is configured to intelligently prevent bursts of unexpected discharge pressure and/or to provide a wide range of available pressure levels to users of the system. Moreover, the system may be operated without requiring a user to remain in the operator cab to manually declutch or otherwise power down a liquid pump when intake pressure is positive and additional pumping pressure is not needed.

According to any preferred embodiment, a vehicle having a fluid delivery system is provided. The fluid delivery system includes a liquid pump configured to pump liquid from a liquid intake system to a liquid discharge system. The liquid pump is mechanically driven by a fixed displacement hydraulic motor. The fixed displacement hydraulic motor is driven by a variable displacement hydraulic pump. The variable displacement hydraulic pump is driven by an engine. A pressure control system disposed on the vehicle is operably connected to the engine and is configured to receive and interpret a signal representing engine speed. The pressure control system is also operably connected to one or more pressure transducers disposed on or downstream of the liquid pump. The pressure control system sends control signals or otherwise controls the variable displacement hydraulic pump, controllably varying the flow of oil (or other suitable hydraulic fluid) provided from the variable displacement hydraulic pump to the fixed displacement hydraulic motor. The pressure control system is configured to use the signal representing engine speed to aid in pressure control/governing. The resulting system is less reliant on feedback downstream of the liquid pump and is faster to respond to changing conditions than a system that attempts to directly govern engine speed.

Various embodiments relate to a method for providing pumping pressure on a vehicle, the vehicle having an engine that provides mechanical energy to a fluid delivery system. The method includes using a pressure control system to begin to cause the fluid delivery system to increase liquid pressure output to match a target liquid pressure output value. The method further includes receiving a first signal from the engine at the pressure control system, the first signal representing the speed of the engine in terms of revolutions per minute of the engine. The method further includes determining whether the engine revolutions per minute have exceeded those necessary for the fluid delivery system to match the target liquid pressure output and sending a signal from the pressure control system to a component of the fluid delivery system that may cause the reduction of liquid pressure output regardless of the engine speed.

It is important to note that the construction and arrangement of the elements of vehicle 50 and/or vehicle fluid delivery system 200 as shown in the exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the firefighting vehicle may be constructed from any of a wide variety materials that provide sufficient strength or durability, in any of a wide variety of colors, textures and combinations. Accordingly, all such modifications are intended to be included within the scope of the present inventions. Other substitutions, modifications, changes and omissions may be made in the design, operating conditions and arrangement of the preferred and other exemplary embodiments without departing from the spirit of the appended claims.

Further, although engine speed is often described based on the units of revolutions per minute and/or the text "revolutions per minute" is used in the description and figures, it should be appreciated that any signal representing engine speed may be used in place of revolutions per minute. Moreover, although pressure is sometimes described in terms of pounds per square inch (PSI), any signal representing liquid pumping pressure (or from which pressure can be derived) may be used by the system.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the appended claims.

What is claimed is:

1. A method for providing a pumping pressure to a vehicle having an engine that provides mechanical energy to a fluid delivery system and for moving the vehicle, the method comprising:
 providing a pressure control system to the vehicle and operatively coupling the pressure control system to the engine and the fluid delivery system, the pressure control system being configured to complete the steps of:
  causing the fluid delivery system to change liquid output pressure without changing the speed of the engine being used to move the vehicle;
  sending a first signal to the fluid delivery system, the first signal representing a command to cause the fluid delivery system to increase liquid output pressure,
  determining that the liquid output pressure is not increasing as expected in response to the sent first signal,
  receiving a second signal representing the engine speed at the pressure control system,
  using the pressure control system to determine that the engine is operating at a relatively high speed,
  sending a third signal to the fluid delivery system, the third signal representing a command to return the liquid output pressure to a last reached pressure value, and
  causing a low supply indication to be communicated from the pressure control system.

2. The method of claim 1, wherein the provided pressure control system is further configured to complete the step of:
 sending a fourth signal to the fluid delivery system, the fourth signal representing a command to discontinue attempting to increase liquid output pressure.

3. The method of claim 1, wherein the provided pressure control system is configured to complete the step of receiving the second signal in terms of revolutions per minute of the engine.

4. The method of claim 3, wherein the using the pressure control system is configured to complete the step of determining that the engine is operating at the relatively high speed if the engine is spinning at faster than 1,200 revolutions per minute.

5. The method of claim 1, wherein the provided pressure control system is configured to complete the step of receiving the second signal from the engine.

6. The method of claim 1, wherein the pressure control system is configured to complete the step of determining that the engine is operating at the relatively high speed by evaluating whether the engine is being taxed.

7. The method of claim 6, wherein the pressure control system is configured to complete the step of determining that the engine is operating at the relatively high speed by evaluating the engine temperature.

8. The method of claim 6, wherein the pressure control system is configured to complete the step of determining that the engine is operating at the relatively high speed by evaluating the fuel being injected into the engine.

9. The method of claim 1, wherein the provided pressure control system is configured to complete the step of providing the low supply indication to at least one of an operator interface, a display, and an audio system.

10. The method of claim 1, wherein the provided pressure control system is configured to complete the step of determining that the liquid output pressure is not increasing as expected based on at least one of a threshold determination, an expected rate of increase, and an increase relative to the command to cause the fluid delivery system to increase liquid output pressure.

* * * * *